United States Patent
Klein

(10) Patent No.: US 9,864,669 B1
(45) Date of Patent: Jan. 9, 2018

(54) MANAGING DATA CENTER RESOURCES

(75) Inventor: Matthew D. Klein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 13/402,691

(22) Filed: Feb. 22, 2012

(51) Int. Cl.
*G06F 15/16* (2006.01)
*G06F 11/32* (2006.01)
*H04L 12/24* (2006.01)

(52) U.S. Cl.
CPC ............ *G06F 11/325* (2013.01); *H04L 41/08* (2013.01); *H04L 41/24* (2013.01)

(58) Field of Classification Search
CPC ...... G06F 9/4881; G06F 1/263; G06F 11/323; H04L 69/329; H04L 29/06; H04L 41/0213; H04L 41/0233; H04L 41/0266; H04L 41/048; H04L 67/02; H04L 67/025; H04L 67/12; H04L 63/08; H04L 63/102; H04L 67/14; H04L 67/30; H04L 12/2602; H04L 43/00; H04L 12/2424; H04L 12/2455; H04L 65/105
USPC .......... 709/223, 224; 340/6.1, 631.16, 853.2, 340/691.1, 691.6
See application file for complete search history.

(56) References Cited

U.S. PATENT DOCUMENTS

| | | | |
|---|---|---|---|
| 6,867,704 B2 * | 3/2005 | Pellegrino ................. | 340/815.45 |
| 7,484,111 B2 * | 1/2009 | Fung et al. .................... | 713/320 |
| 8,176,490 B1 * | 5/2012 | Jackson .......................... | 718/100 |
| 2002/0083166 A1 * | 6/2002 | Dugan et al. ................... | 709/223 |
| 2002/0099873 A1 * | 7/2002 | Hileman et al. ................. | 710/1 |
| 2002/0152305 A1 * | 10/2002 | Jackson et al. ................ | 709/224 |
| 2002/0190868 A1 * | 12/2002 | Dearborn et al. .......... | 340/691.1 |
| 2003/0164771 A1 * | 9/2003 | Dove et al. ..................... | 340/679 |
| 2003/0229806 A1 * | 12/2003 | Piel et al. ...................... | 713/200 |
| 2004/0024571 A1 * | 2/2004 | Trinon et al. ................... | 702/186 |
| 2006/0015611 A1 * | 1/2006 | Savoor et al. ................. | 709/224 |
| 2006/0194460 A1 * | 8/2006 | Chen ...................... | G06F 13/409 439/108 |
| 2006/0230149 A1 * | 10/2006 | Jackson ......................... | 709/226 |
| 2006/0262086 A1 * | 11/2006 | Bray et al. ...................... | 345/156 |
| 2007/0106605 A1 * | 5/2007 | Kaplan ................ | G06Q 20/102 705/40 |
| 2008/0030362 A1 * | 2/2008 | Huang et al. ............ | 340/815.45 |
| 2008/0144793 A1 * | 6/2008 | King .................... | H04M 1/2471 379/201.02 |
| 2008/0184241 A1 * | 7/2008 | Headrick et al. ............. | 718/102 |
| 2008/0313319 A1 * | 12/2008 | Geffin ........................... | 709/223 |
| 2011/0047188 A1 * | 2/2011 | Martins et al. ................ | 707/803 |

(Continued)

*Primary Examiner* — John MacIlwinen
(74) *Attorney, Agent, or Firm* — Knobbe, Martens, Olson & Bear, LLP

(57) ABSTRACT

Various features are disclosed for providing indicators of activity on server computing systems or other devices. An indicator component can indicate whether data center equipment is being used by a user and/or to support a user, and that therefore the operation of the data center equipment should not be impacted. One or more indicator components can be affixed to or integrated with the exterior of data center equipment, e.g., added to the rack on which server computing systems are mounted, integrated with a networking component that provides connectivity to the server computing systems mounted in the rack, or the like. The indicator components can be controlled by software or hardware implemented in a server computing system, a networking component, and/or remotely from an administrator system.

27 Claims, 6 Drawing Sheets

(56) References Cited

U.S. PATENT DOCUMENTS

| | | | |
|---|---|---|---|
| 2011/0197273 A1* | 8/2011 | Krumel | 726/13 |
| 2011/0255289 A1* | 10/2011 | Krah | 362/253 |
| 2012/0068821 A1* | 3/2012 | Van Oost | H04L 12/10 340/6.1 |
| 2012/0072762 A1* | 3/2012 | Atchison et al. | 714/2 |
| 2012/0147552 A1* | 6/2012 | Driggers | 361/679.53 |
| 2013/0145004 A1* | 6/2013 | Kumhyr | G06F 8/65 709/223 |
| 2013/0151697 A1* | 6/2013 | Delio | 709/224 |

* cited by examiner

MANAGING DATA CENTER RESOURCES

BACKGROUND

Data centers typically house a large number of interconnected computing systems. There are two main types of data centers: private data centers, which service a single organization, and public data centers, which provide computing resources to an organization's customers. Public and private data centers can provide a variety of hosting services, such as web hosting, data backup, and the like. Public data centers may also provide remote computing capacity as a service to organizations and other customers.

The individual computing systems of a data center may be disconnected, powered down, or otherwise made unavailable for various reasons, such as to perform maintenance. To facilitate maintenance of the individual computing systems, each computing system may have a barcode, asset tag, or other unique identifier affixed to it. For example, a barcode with adhesive backing can be placed on each computing system so that a technician can locate the proper computing system for maintenance. A technician may be provided with the unique identifier of a computing system to be maintained. The technician can use the unique identifier to locate the proper computing system and begin maintenance, in some cases disconnecting the computing system or powering it down.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
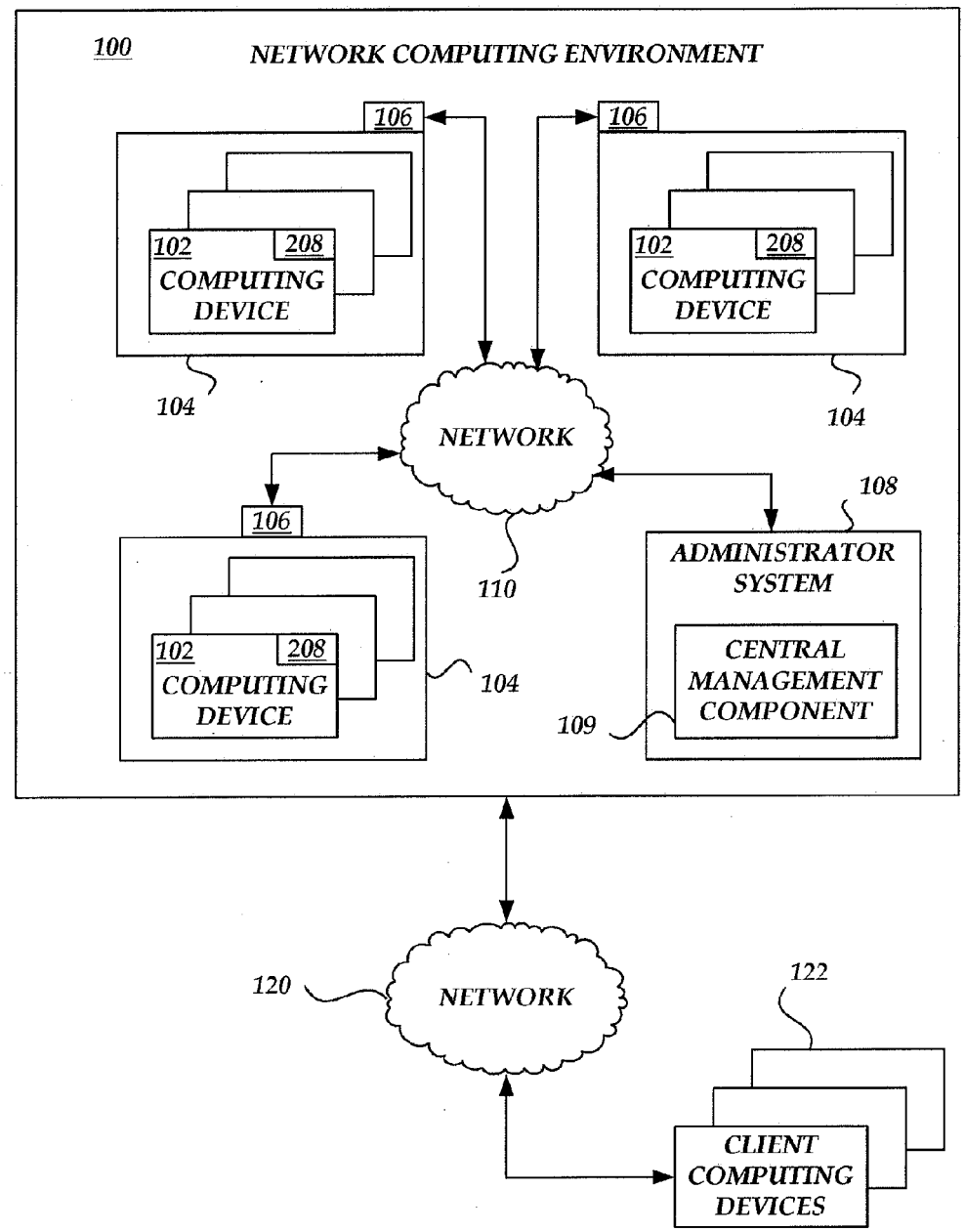
FIG. 1 is a network diagram schematically illustrating an embodiment of a network computing environment that can provide remote computing resources to client computing devices.

Various features are disclosed for providing indications of the activity of data center components such as networking devices, power distribution units, server computing systems, storage servers and other devices. As the scale and scope of data centers has increased, the task of provisioning, administering, and managing the physical and virtual computing resources of the data center has become increasingly challenging. Users, e.g., customers of a service provider, often expect modern network computing service providers to provide 99% or greater uptime. In order to ensure such availability, preventive maintenance may often be performed, and troubleshooting is expected to be completed with particular focus on speed and reduction of downtime. One problem, among others, is that data centers may have hundreds or thousands of similar computing systems, and it may be difficult to quickly and accurately identify the correct computing system to be taken offline for maintenance. Ensuring proper identification of a system to be taken offline can be more difficult under the time pressure associated with high uptime expectations. Taking a computing system offline that is operating on behalf of user may cause an irreparable loss of customer data, violate uptime guarantees specified by service-level agreements (SLAs), or further aggravate problems experienced by other computing devices.

To address some or all of these deficiencies, embodiments of systems and methods are described for indicating whether a data center component is operating on behalf of a user and/or supporting a computer system that is operating on behalf of a user. In some embodiments, such indications can include colored or flashing lights, message display screens, dynamic barcodes, other visual or aural indicators, or any combination thereof. Indicator components can be affixed to or integrated with the exterior of data center equipment (e.g., integrated with a server computer system), added to the rack on which the server computing systems are mounted, integrated with a networking component that provides connectivity to the server computing systems mounted in the rack, or the like. The indicator components can be controlled by software or hardware implemented in one or more server computing systems or networking components. The indicator components can also be controlled remotely, from an administrator system or other component inside or outside of the data center.

In one example scenario, when a technician is dispatched to a server computing system, the technician can be provided with a unique identifier with which to locate the server computing system. Upon arrival at the server computing system, the technician can first check an indicator component associated with that server in order to verify that there is no customer activity on the server before powering the server down, disconnecting it, running maintenance software on it, etc. If the indicator component shows customer activity on the server, the technician can know that the server is still active and that the server should not be interrupted. The technician can then take other actions, such as verifying with an administrator that the technician is at the right server computing device and whether the server may indeed be powered down (even though the indicator says otherwise). Such a verification procedure, facilitated by the indicator component, can reduce or prevent the accidental disconnection of active servers based on erroneous identifier labels, miscommunication, technician error, and the like. Further, if a technician mistakenly powers down a server associated with an indicator that reflects no customer activity, little or no adverse affect to customer usage or data may be experienced because the server was not being used by a user or operating on behalf of a customer at the time.

Various aspects of the disclosure will now be described with regard to certain examples and embodiments, which are intended to illustrate but not limit the disclosure.

Network Computing System Overview

Prior to describing server activity indicator features in detail, an example computing environment in which these features can be implemented will be described. FIG. 1 illustrates an example network computing environment, such as might be implemented to provide computing and storage capacity to any number of internal or external entities. FIG. 1 includes a network computing environment 100 in communication with one or more client computing devices 122 over a network 120. In one embodiment, the network computing environment 100 can provide computing and storage capacity to users in a single enterprise, such as a company or university. In another embodiment, the network computing environment 100 provides hosting services to customers such as business entities. For example, the network computing environment 100 can be a data center or server farm that provides web hosting, data backup and mirroring, disaster prevention co-locations, and the like. In yet another embodiment, the network computing environment 100 can provide computing and storage capacity to users in the general public. For example, the network computing environment 100 can be operated by a service provider that offers computing capacity and electronic storage space as a service. Users may access the service on-demand or on a subscription basis. In some embodiments, the network computing environment 100 may provide a combination of the above-mentioned services to either internal or external users, or to both.

The network computing environment 100 illustrated in FIG. 1 includes an administrator system 108 and racks 104 that house computing devices 102. Each rack 104 can be configured to house multiple computing devices 102. The racks 104 may have a networking component 106, such as a hub or a switch, connecting each of the computing devices 102 to a network 110. The various computing devices 102 can use the network 110 to communicate with each other, the administrator system 108, client computing devices 122, or other components not pictured. In some embodiments, the network 110 may be a private network, such as, for example, an intranet or internal subnet that is wholly or partially inaccessible to non-privileged users, and that can connect to the network 120, which can be the Internet. In some embodiments the network computing environment 100 may have more or fewer components than are illustrated in FIG. 1.

In some embodiments, each computing device 102 is embodied by one or more physical computing systems. For example, the computing device 102 can be a server computing system that has components such as a central processing unit (CPU), input/output (I/O) components, storage, and memory. The computing devices 102 may include one or more physical computing systems, which in turn may host one or more virtual machines. For example, a computing device 102 may include a virtual machine manager, such as a hypervisor, to manage the virtual machines (see, e.g., FIG. 3).

In some embodiments, the network computing environment 100 may be a data center containing several racks 104. The network computing environment 100 can communicate, over the network 120, with other network computing environments 100, which may be spread across many geographical locations. In some embodiments, the network computing environment 100 may contain only one rack 104, or may contain zero racks 104. For example, a network computing environment 100 may have computing devices 102 embodied as one or more large-scale computing devices, such as mainframes or midrange computers, which may not be grouped together physically in a rack 104.

The network computing environment 100 may have an administrator system 108 for managing the several computing devices 102 and other components of the network computing environment 100. For example, the administrator system 108 may be a personal computer used by a system administrator. The administrator system can have a central management component 109 to monitor the utilization of the computing devices 102, and to receive an alert if one of the computing devices 102 experiences problems or loses network connectivity. The central management component 109 may be implemented in software, hardware, or some combination thereof. For example, the central management component 109 may be a software application, executing on the administrator system 108, which monitors the state of computing devices 102 and manages the state of indicator components 208 associated with the computing devices 102. The monitoring and management functions of the central management component 109 can, in some cases, be performed in conjunction with a component of the individual computing devices 102, such as the indicator manager described below with respect to FIG. 3. In some embodiments, the administrator system 108 may have a dedicated network connection to each rack 104 or computing device 102, over which the central management component 109 or some other component of the administrator system 108 can communicate, even when the regular network connection of the computing device 102 is down or otherwise unavailable. In some embodiments, there may be multiple administrator systems 108, or a single administrator system 108 comprising multiple computing devices. In some embodiments the administrator system 108 can be a component of one or more computing devices 102.

Some client computing devices 122 can be remote from the network computing environment 100. In one example, users can use the client computing devices 122 to access the network computing environment 100 over the communication network 120. The network 120 may, for example, be a publicly accessible network or a private network. In some embodiments, the network 120 may include a private network, personal area network, local area network, wide area network, or combination thereof, each with access to and/or from the Internet.

In some embodiments, the client computing devices 122 may include any of a number of computing devices that are capable of communicating over the network 120 including, but not limited to, a laptop, personal computer, personal digital assistant (PDA), a mobile phone (such as a smart phone or other wireless handheld device), PDA, electronic book reader, digital media player, tablet, kiosk, or the like. The client computing devices 122 may connect to and interact with one or more computing devices 102 in order to execute programs, process data, or request network content. For example, a client computing device 122 may connect to a computing device 102 that is running a virtual machine configured to provide computing resources to satisfy the specific needs of the user of the client computing device 122. In another example, a client computing device 122 may be interacting with a web site that, unknown to the user of the client computing device 122, is hosted by the network computing environment 100.

Advantageously, in certain embodiments, some or all of the computing devices 102 can include or communicate with an indicator component 208 that is configured to indicate an operating state of the computing device 102. For example, if a computing device 102 is powered on but does not have any active network connections to client computing devices 122 or is not operating on behalf of a customer or user, the indicator component 208 may visually indicate this state with a green light. Such a visual indication can be helpful to technicians and other personnel when determining whether to perform maintenance on a computing device 102, power the computing device 102 down, or otherwise perform a procedure that would affect customer or other user data, degrade the user experience, break an SLA, and the like. The indicator component 208 can indicate whether a computing device 102 has a database, document, or other data associated with the user loaded into memory or otherwise subject to active processing. In some cases, the indicator component 208 can be used to indicate whether a virtual machine instance associated with a customer or other user is executing on the computing device 102. When the computing device 102 does have an active network connection with a client computing device 122, or when the computing device 102 is operating on behalf of a customer or user, the indicator component 208 may visually indicate this state with a red light, signaling that the computing device 102 is not to be powered down, caused to lose its network connection, or otherwise have its processing interrupted. As will be appreciated, the indicator can take many other forms than a red or green light, some examples of which are described in greater detail below.

Figure 2:
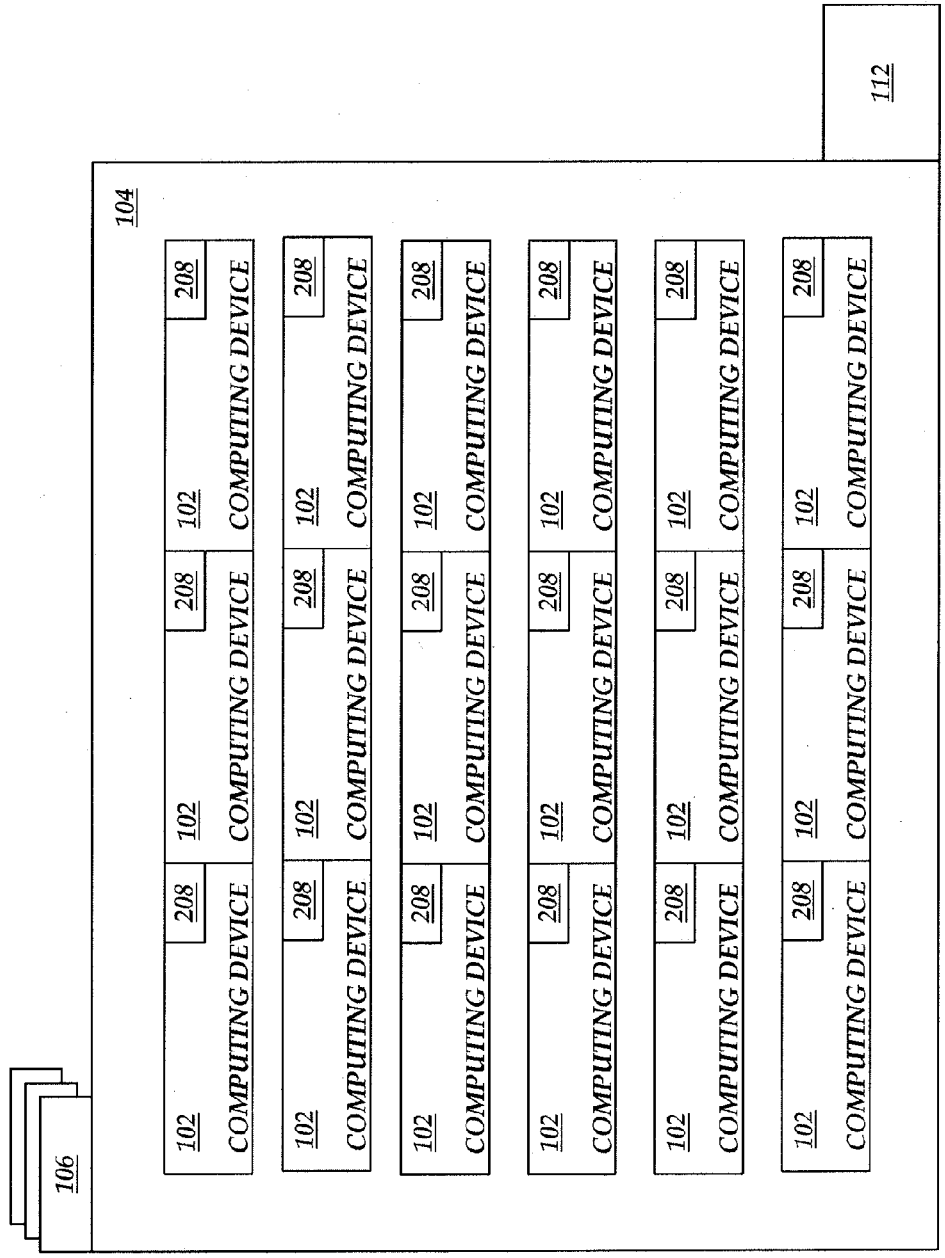
FIG. 2 is a block diagram illustrating an embodiment of a server rack configured with a networking component and multiple computing devices.

With reference now to FIG. 2, one embodiment of a server rack 104 will be described. The rack 104 may be any frame or enclosure capable of mounting one or more servers, such as the computing devices 102 of FIGS. 1 and 3. For example, the rack 104 can be a four-post server rack, a server cabinet, an open-frame two-post rack, a portable rack, a LAN rack, combinations of the same, or the like. Each of the computing devices 102 can include or communicate with an indicator component 208, such as an LED or other lighting component, which can indicate the state of the computing device 102. In some embodiments, the computing devices 102 mounted on the rack 104 may be networking components, such as switches or routers, instead of or in addition to servers. For example, a large data center may have, in addition to racks 104 which contain servers, one or more racks 104 which may contain any number of switches.

The example rack 104 illustrated in FIG. 2 mounts computing devices 102 in multiple columns and rows. In some embodiments, the rack 104 many be configured for mounting computing devices 102 only in columns, or only in rows. The rack 104 may provide some resources shared by the computing devices 102, such as power, network connectivity, and the like. For example, the rack 104 may have a networking component 106, such as a hub or a switch, which provides network connectivity to the computing devices 102. In some embodiments, the rack 104 may have more than one networking component 106. A networking component 106 may have multiple ports, with each of the computing devices 102 having a corresponding port with which to connect in order to communicate with the network 110. In some embodiments, each computing device 102 may have more than one corresponding port in the networking component 106. For example, each computing device 102 may be configured with two network connections. One network connection provides connectivity to the other computing devices 102 and the client computing devices 122. A separate network connection can be provided for connectivity to the administrator system 108. The second network connection can provide users of the administrator system 108, for example system administrators, with access to the computing devices 102 even when the regular network connection is down or otherwise not available.

As will be described below with respect to FIG. 4B, a networking component 106, such as a top-of-rack switch, can be configured with indicator components which indicate a current state of each connected computing device 102. For example, each port may have a corresponding indicator component which has an LED that flashes red when the computing device 102 connected to the corresponding port is operating on behalf of a customer or other user, and green when the computing device 102 is not operating on behalf of a customer or other user. The indicator components can be provided on the networking component 106 in addition to the indicator component 208 of each computing device 102 to provide a separate determination of the state of the computing device 102. For example, a computing device 102 may load data into volatile memory and then begin processing the data at the request of a client computing device 122. The indicator component 208 of the computing device 102 may flash red, indicating that the computing device 102 is actively processing customer data and therefore should not be taken offline for maintenance. However, the computing device 102 may have lost its network connection, and the previously connected client computing device 122 may have since been connected to a different computing device 102. If the computing device 102 has an additional network connection to the administrator system 108, the administrator system 108 may be able to reset the indicator component 208. However, if the computing device 102 has only been configured with one network connection, an administrator system 108 may not be able to connect. In such a case, the administrator system 108 can be configured to detect that the computing device 102 has lost its network connection, and instruct the corresponding indicator component on the network component 106, or associated with the network component 106, to flash green.

A rack 104 may also have other supporting components, such as one or more power distribution units (PDUs) 112. The PDUs 112 can provide power, from a data center power source, to the various computing devices 102 mounted in a rack 104 and to the networking components 106 and other electric devices associated with the rack 104. Similar to the networking components 106 described above, a PDU 112 may be configured with one or more indicator components which can indicate a current state of each connected computing device 102. For example, the indicator components associated with the PDU 112 may indicate whether or not a computing device 102 connected to the PDU 112 may be disconnected from the PDU 112 or otherwise powered down, whether all of the computing devices 102 connected to the PDU 112 may be powered down, or whether the PDU 112 itself may be powered down. The indicators may be affixed to the PDU 112, or they may be independent of the PDU 112. The administrator system 108 may have a central management component 109 that is configured to remotely control the state of the indicator components associated with the PDU 112.

Computing Device Overview

Figure 3:
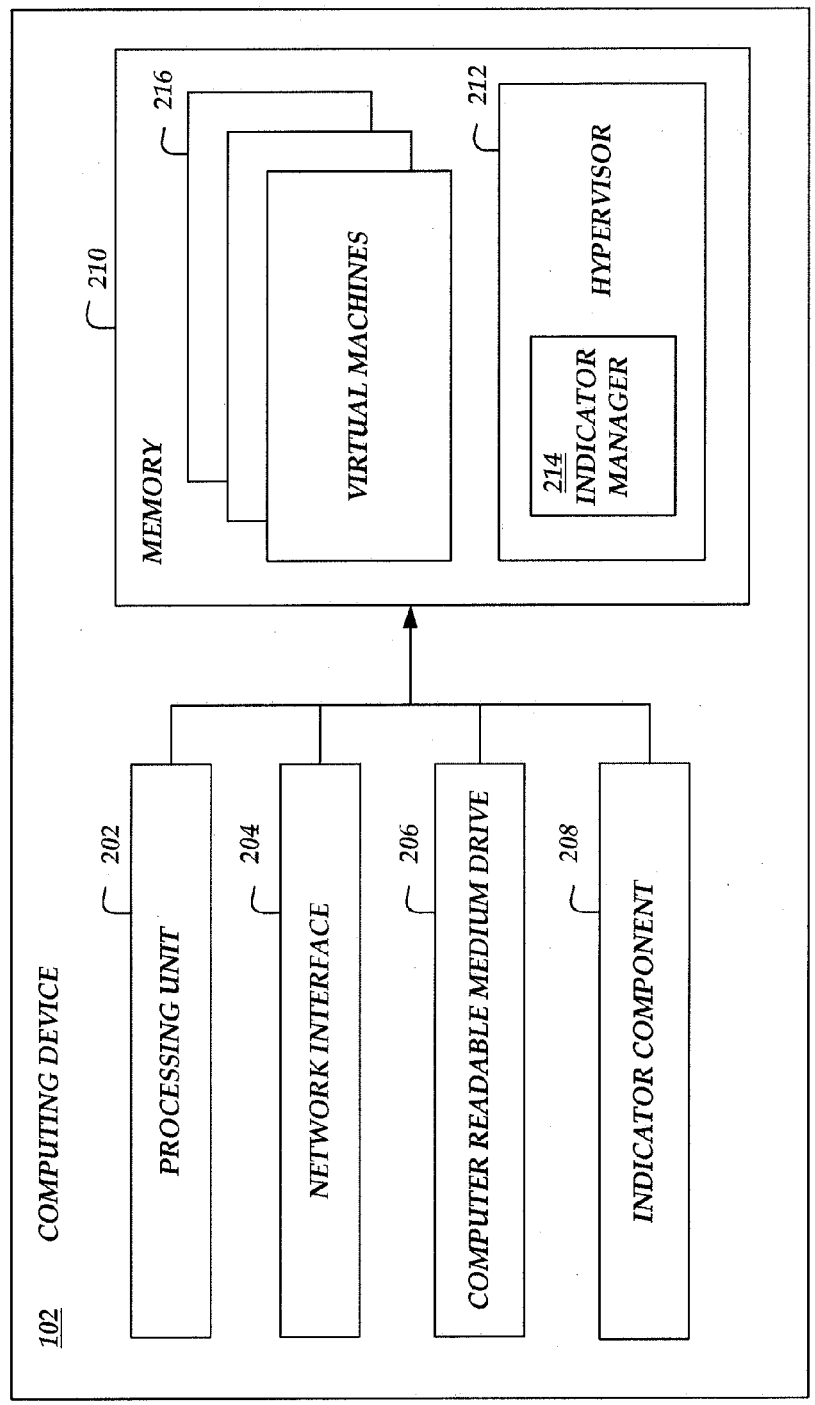
FIG. 3 is a block diagram illustrating an embodiment of a computing device configured with an indicator component.

Referring now to FIG. 3, one embodiment of a computing device 102 is illustrated in more detail. The computing device 102 can be a server, switch, router, mass storage device, or any other computing device. The computing device 102 illustrated in FIG. 3 can be a server, and can comprise a processing unit 202, a network interface 204, a computer readable medium drive 206, an indicator component 208, and a memory 210. The network interface 204 can provide connectivity to one or more networks or computing systems, such as the network 110, administrator system 108, or client computing device 122 illustrated in FIG. 1. The processing unit 202 can receive information and instructions from other computing systems or services via the network interface 204. The network interface 204 can also store data directly to memory 210. As described below with respect to FIG. 4A, the indicator component 208 can provide a visual indication, on the exterior of the computing device 102, of the current state of the computing device 102. In some embodiments, the indicator component 208 is not physically located in or on the computing device 102. For example, the indicator component 208 may be located on the rack 104 or in a separate area of the data center, such as on a master indicator panel. In such a configuration, the computing device 102 may be in communication with the indicator component 208, for example through a wired or wireless connection.

The memory 210 generally includes RAM, ROM and/or other persistent or non-transitory memory. The memory 210 contains a hypervisor 212 for managing the operation and lifetime of one or more virtual machines 216, and an indicator manager 214 for managing the indicator component 208. In some embodiments, the indicator manager 214 can be integrated into the hypervisor 212, as illustrated in FIG. 3, or it may be a separate module or component. For example, indicator manager 214 may be a separate module within the memory 210, or its functionality may be augmented or replaced by a separate administrator system 108 which manages the indicator components of multiple computing devices 102. In some embodiments, the computing device 102 need not host virtual machines 216, and therefore the computing device 102 may not have a hypervisor or virtual machines 216 in memory 210. Instead, the indicator manager 214 can be a standalone application running in memory 210.

In some embodiments, the computing device 102 can be configured to host several virtual machines 216 at the request of customers or other users of client computing devices 122. For example, a business entity may rent computing and storage capacity from the network computing environment 100, and may choose a virtual machine configuration or have a virtual machine image customized for their needs. The virtual machine images can be deployed onto one or more computing devices 102. On a schedule, or on demand, the virtual machine 216 instance can be launched and managed by the hypervisor 212. The use of virtual machines 216 managed by a hypervisor 212 can allow several different computing environments to execute on a single computing device 102 at a time, increasing efficiency for the network computing environment 100 and lowering costs for the customer. For example, a single computing device 102 may at any time have one, two, or (possibly many) more virtual machines 216 operating on behalf of customers, actively processing data and responding to client computing device 122 requests. Each virtual machine 216 may be running a different operating system, and may correspond to different customers or client computing devices 122. The hypervisor 212, or another component of the computing device 102, such as the indicator manager 214, can launch and destroy virtual machine 216 instances automatically, in response to requests from client computing devices 122, or in response to commands from the administrator system 108.

In operation, a computing device 102 may receive a request from a client computing device 122, and in response to the request, the hypervisor 212 may instantiate a virtual machine 216 to respond to the request from the client computing device 122. The client computing device 122 may direct the computing device 102, through the virtual machine 216 instance, to load and process data. In response to receiving such a direction, the indicator manager 214 or some other component of the computing device 102 can change the state of the indicator component 208. For example, the indicator manager 214 may change the state of the indicator component 208 to red, indicating that the computing device 102 is operating on behalf of a customer, and therefore the computing device 102 is not to be disconnected from the network, powered down, or otherwise interfered with (e.g., without administrator approval). In some embodiments, the state of the indicator component 208 can be changed earlier, such as when the virtual machine 216 is initially instantiated.

In response to the completion of processing, or when the computing device 102 stops operating on behalf of a customer, or in response to some other event, the indicator manager 214 can change the state of the indicator component 208 to green. In this example, green can indicate that that the computing device 102 is not running workloads for a customer, and therefore the computing device 102 may be disconnected from the network, powered down, or otherwise maintained without affecting a customer. The indicator manager 214 can be configured to track which instantiated virtual machines 216 are associated with customers. This can prevent a situation where, for example, one virtual machine has been terminated and the indicator component 208 is changed to green even though a second virtual machine 216 is still running.

While the description of the computing device 102 above is provided with respect to a hypervisor 212 and indicator manager 214 managing multiple virtual machine 216 instances, alternative implementations are possible. For example, an operating system may run directly on the hardware of the computing device 102, and may not have a hypervisor 212, or virtual machines 216. Such a configuration can still include an indicator component 208 and an indicator manager 214 or some other management module or component, embodied in hardware or software, that monitors the computing device 102 and controls the state of the indicator component 208 based on whether the computing device 102 is operating on behalf of a customer or other user. In some cases, the indicator component 208 can be controlled by the administrator system 108, or by a remote system or component under the control of the customer.

Example Indicator Components

Figure 4A:
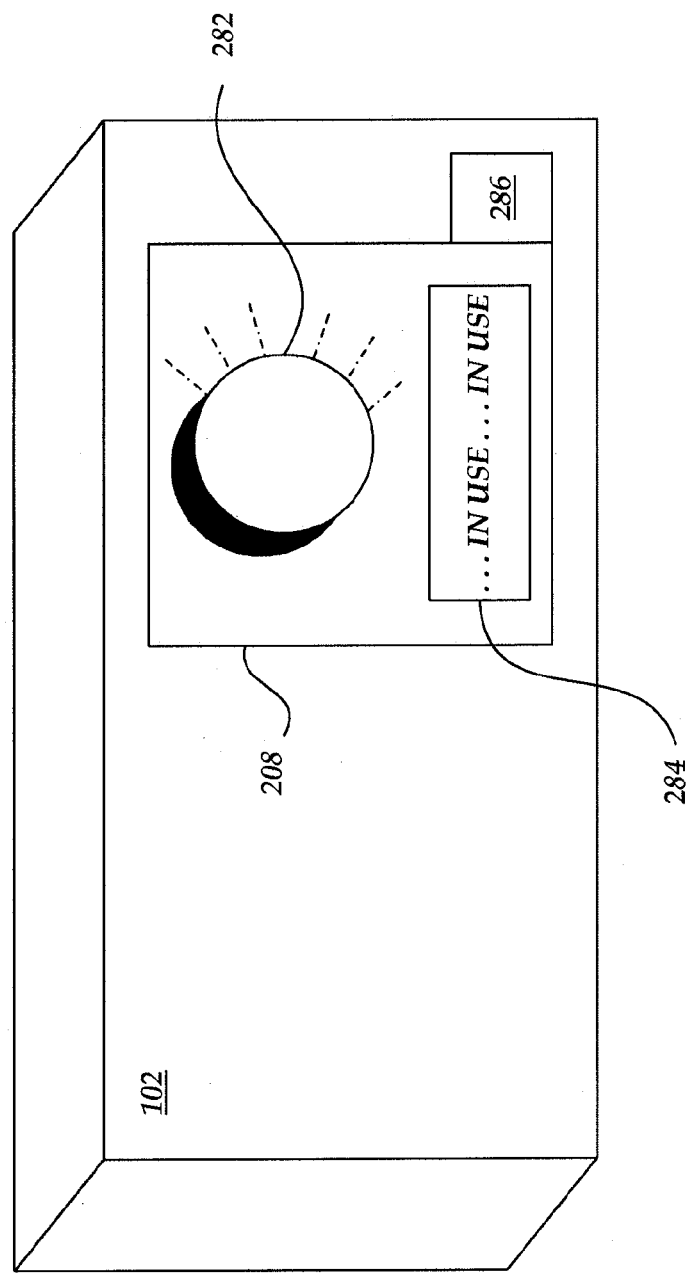
FIG. 4A is a diagram illustrating an embodiment of a computing device configured with an indicator component including a lighting component and a message display.

FIG. 4A illustrates an example of the exterior of a computing device 102 with an indicator component 208. In some embodiments, the computing device 102 can be a networking device, such as a switch or a router. The computing device 102 can also be a server, as described above with respect to FIG. 3. The computing device 102 may contain hot-swappable components, such as hard drives. The computing device 102 may have multiple trays or bays for hot-swappable hard drives. Each bay or hot-swappable component may be associated with a separate indicator component 208. In some embodiments, indicator components 208 may be affixed to or otherwise associated with data center components that support computing devices 102 which are operating on behalf of customers. Such data center components can include, for example, PDUs 112, heating, ventilation, and air conditioning (HVAC) units, and the like.

As described above, the indicator component 208 can be used to visually display, on the exterior of a computing device 102 or elsewhere on the rack 104, information about the state of the computing device 102. Specifically, the indicator component 208 can indicate whether the computing device 102 is operating on behalf of a customer or other user. The indicator component 208 can be a lighting component 282 (e.g., LED, incandescent, or other), a message display 284, and/or some other component, such as a dynamic barcode display programmable through software on the computing device 102 or the administrator system 108.

In operation, the indicator component 208 can be controlled by the indicator manager 214, some other component of the computing device 102, by the administrator system 108, and/or by some other component of the network computing environment 100. In one example, as described above, the state of the indicator component 208 can be updated by the indicator manager 214 when customer or user-directed activity commences, and when it ceases. In another example, the state of the indicator component 208 can be updated by the administrator system 108 interactively, automatically, or by a manual override of the update initiated by the indicator manager 214. For example, a central management component 109 of the administrator system 108 can be in communication with both the computing device 102 and the indicator component 208. In some embodiments, the indicator component 208 may have a network adapter 286 separate from the network interface 204 of the computing device 208 that it is associated with. The central management component 109 can therefore be in communication with the indicator component 208 through the network adapter 286. The central management component 109 can monitor the utilization of the computing device 102 and instruct the indicator manager 214 to change the state of the indicator component 208 in response to a change, or change the state of the indicator component 208 directly. In some cases, the indicator manager 214 and the administrator system 108 can both monitor the utilization of the computing device 102 and exchange information when a change is detected that may trigger a change in the state of the indicator component 208. If there is a discrepancy between the determinations of the indicator manager 214 and the administrator component 108, an alert can be issued so that appropriate support staff can be notified of a potential issue. In some embodiments, the administrator system 108 may update the indicator component 208 directly, without the intervention of an indicator manager 214.

The message display 284 can display text, for example in a scrolling display. The text can be used to indicate, in words, the same information as the lighting component 282. In some embodiments, the message display 284 can provide written messages to augment the state of the lighting component 282. For example, the message display 284 can be used to display data about how the computing device 102 is operating on behalf of a customer, such as how many virtual machines 216 have been instantiated, any fault or other issue the computing device 102 has experience, a unique identifier of the computing device 102, or instructions for maintenance to be performed.

The indicator component 208 can be consulted by repair technicians or other personnel to determine whether a computing device 102 may be taken offline for maintenance, or whether the technician is at the wrong computing device 102. If the indicator component 208 is configured with a dynamic barcode display, or if there is a barcode present on the exterior of the computing device 102, the technician can scan the barcode with a mobile barcode scanning device, and receive information about the computing device 102. In some embodiments, RFID technology can be used instead of or in addition to barcodes and scanners. In some embodiments, not every computing device 102 is configured with an indicator component 208. For example, in one embodiment computing devices 102 that are configured to load and process customer or user data and establish network connections with client computing devices 122 include or communicate with indicator components 208, while other of the computing devices 102 do not.

The administrator system 108 can also be configured to update the state of any indicator components 208 associated with data center components, such as PDUs 112, HVAC systems, and the like, that support computing devices 102. For example, when a computing device 102 is operating on behalf of a customer, the administrator system 108 can update indicator components 208 associated with the PDU 112 that provides power to the computing device 102 and the HVAC unit which controls the temperature of the area of the data center in which the computing device 102 or rack 104 resides. As with the computing devices 102 themselves, technicians can then check whether such data center components are supporting computing devices 102 whose operation is not to be interfered with. In such cases, the supporting data center components are generally not to be interfered with. For example, if a technician powered down a PDU 112 that was powering a computing device 102 operating on behalf of a customer or other user, the computing device 102 may be powered down, thereby compromising customer data on the computing device 102.

Figure 4B:
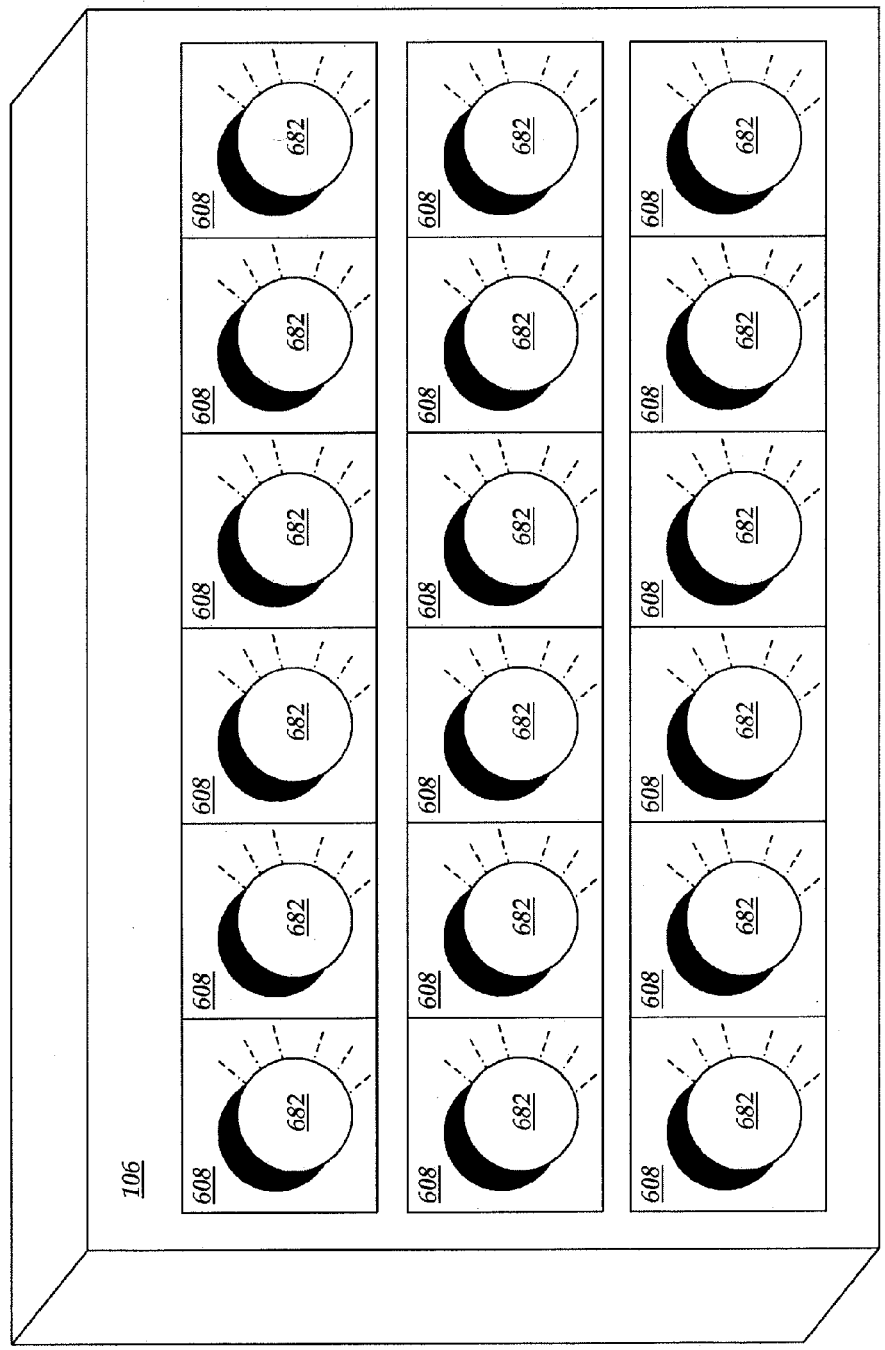
FIG. 4B is a diagram illustrating an embodiment of a networking component configured with multiple indicator components corresponding to multiple connected computing devices.

FIG. 4B illustrates an example of the exterior of a networking component 106 with several indicator components 608. The networking component 106 may be a hub, switch, or any other network-enabled component or device that is configured to provide network access to the several computing devices 102 mounted to a rack 104. The indicator components 608 can include lighting components 682, similar to the lighting components 282 of the indicator components 208 on the computing devices 102, described above. The indicator components 608 may include more or fewer components than illustrated in FIG. 4B. For example, each indicator component 608 may have a message display similar to the indicator components 208 on the computing devices 102.

Each of the indicator components 608 can be associated with a port, on the networking component 106, corresponding to a computing device 102. Each indicator component 608 can be in communication (e.g., connected electrically) with the administrator system 108 or some other management component which manages the state of the indicator component 608. The lighting components 682 can indicate whether the corresponding computing device 102 is operating on behalf of a customer or other user or has an active network connection.

For example, a technician can consult the lighting component 682 corresponding to the computing device 102 of interest to determine whether there is an active network connection to the computing device 102 or whether the computing device 102 is otherwise operating on behalf of a customer. This verification procedure by the technician may be useful when the indicator component 208 of the computing device 102 indicates that there is customer activity or data processing occurring on the computing device 102. Such an indication on the computing device 102 can mean that the computing device 102 is not to be taken offline. In some embodiments, when the lighting component 682 corresponding to the computing device 102 indicates that there is no active connection, the computing device 102 can be taken offline and serviced regardless of the state of the indicator component 208 of the computing device 102. For example, the computing device 102 may have lost its network connection, but may not be aware of it or may not be able to update the indicator component 208 on the computing device 102. In some embodiments, the indicator component 208 can indicate that a network connection to the computing device 102, although not active at a particular instant, was recently active. For example, the lighting component 682 corresponding to the computing device 102 can indicate an active connection for a period of time after the connection has been closed. This period of time can be considered a hysteresis that can be helpful in situations, such as requests for web pages or database records, when open network connections are fleeting and likely to be reopened within a period of time.

In another example, there may be a potential issue with the connection between the computing device 102 and the networking component 106. The central management component 109 or some other component of the administrator system 108 may be configured to ping the computing device 102 to determine whether it is still connected and operable, and the administrator system 108 may not have received a response within an acceptable period of time, or may not have received any response at all. The central management component 109 can change the state of the indicator component 608 associated with the port corresponding to the computing device 102. Such an operation can indicate to a technician that, in addition to the computing device 102 at issue, the technician is authorized to inspect, disconnect, or otherwise maintain other components, up to and including the port associated with the indicator component 608. For example, the cable connecting the computing device 102 to the networking component 106 may be damaged and therefore cause a loss of packets. The indicator component 208 on the computing device 102 may not provide such an indication to the technician, and in some cases the indicator component 208 on the computing device 102 may not be reachable to change its state, as described above. In such a case, the central management component 108 may change the state of the indicator component 608, giving the technician clearance to replace the cable.

In some embodiments, the indicator components 682 can be provided by a separate device that is connected to or otherwise in communication with the networking component 106 utilized by the rack 104. In some embodiments, the administrator system 108 may have a graphic display or physical device that performs the same function as a bank of indicator components 682 associated with the networking component 106. In some embodiments, a collection of indicator components similar to the indicator components 608 illustrated in FIG. 4B may be affixed to or otherwise associated with a PDU 112 to provide indicators for each power port that a computing device 102 is connected to.

Example Process for Controlling Indicator Components

Figure 5:
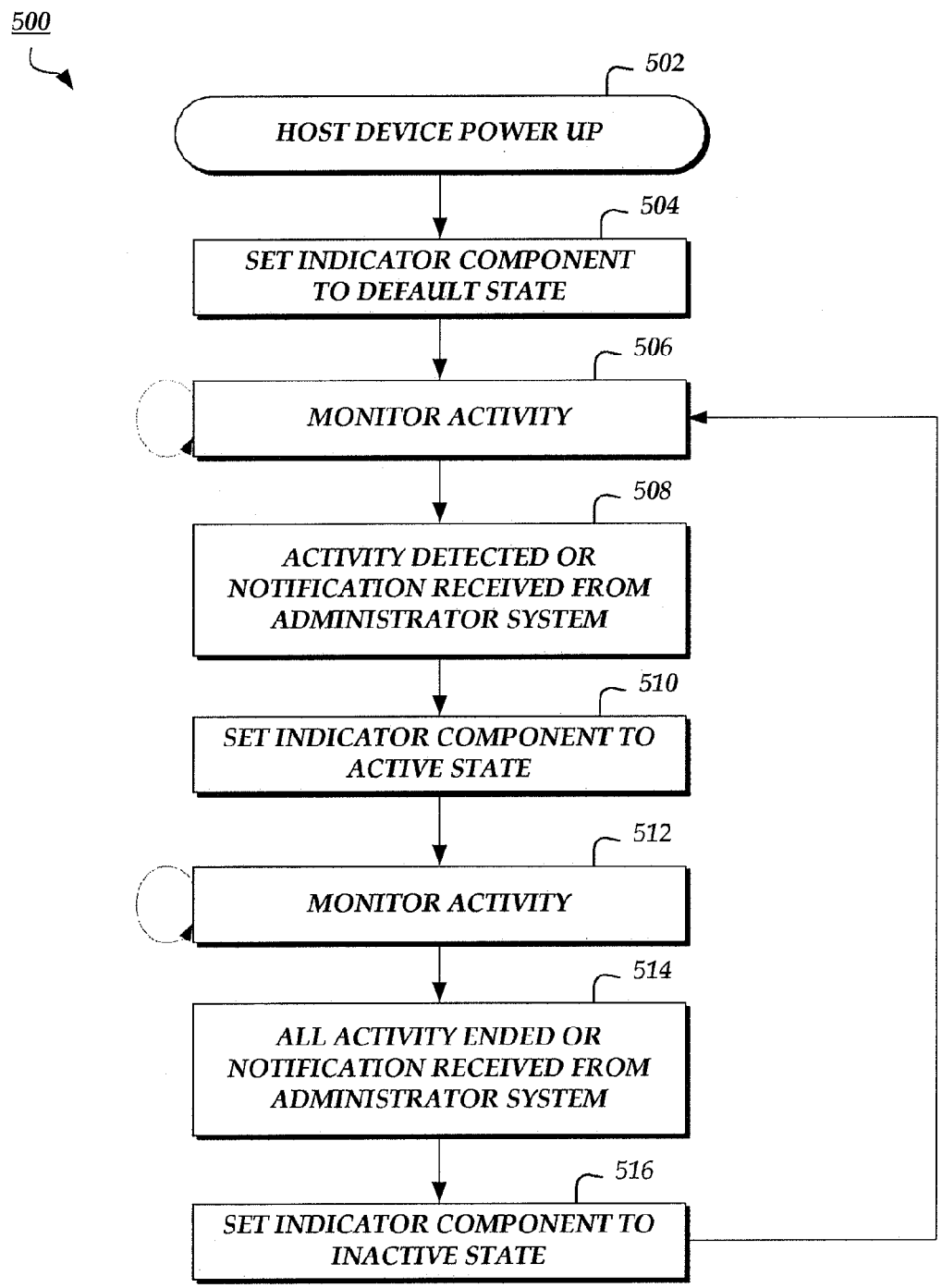
FIG. 5 is a flow diagram illustrating an embodiment of a routine for processing state changes to indicator components.

FIG. 5 illustrates an example process 500 for controlling a state of an indicator component, such as any of the indicator components described above. While the process 500 can be implemented by any computer system, for ease of illustration, the process 500 will be described as being implemented by the indicator manager 214 of the computing device 102 (see FIG. 2). Advantageously, in certain embodiments, the process 500 can set the indicator component 208 of a computing device 102 to a default state upon power up, and then monitor the activity of the computing device 102 and update the indicator component 208 in response to changes in activity until the computing device 102 is powered down, thereby providing a substantially real time indicator of activity on the computing device 102.

While the description of the process 500 which follows is provided with respect to the indicator manager 214 performing a serious of tests and updates to the state of the indicator component 208, alternative implementations are possible. For example, blocks of the process 500 may be performed in a different order, some blocks may be omitted, and additional processing may be added. In some embodiments, all or part of the process 500 may be performed by a different component, such as the hypervisor 212 or a central management component 109. In some embodiments, the process 500 may be performed by the indicator component 208. In such a case, the indicator component 208 can have additional hardware and software components in order to implement the logic of the process 500, and may be embodied in an independent device that can be added to existing computing devices 102, for example as a peripheral device. In some embodiments, the process 500 can be performed to update indicator components 208 on other devices, such as PDUs 112, HVAC systems, and the like.

The process 500 begins at bock 502, when the computing device 102 powers up. The indicator manager 214 or the hypervisor 212 can be among the first software components loaded into memory 210, and can perform system initialization. In some embodiments, the hypervisor 212 can be configured to launch an instance of a virtual machine 216 upon startup so that it is available and ready to receive commands and input from client computing devices 122.

At block 504, the indicator manager 214 can set the indicator component 208 to its default state, which may be either an active state or an inactive state. The indicator component 208 may include a lighting component 282 configured to flash one of two colors, for example green and red, where green represents an inactive state, and red represents an active state. In some embodiments, the lighting component 282 does not flash, but rather emits a steady light. In some embodiments, the lighting component can emit light of other colors, or may emit light to indicate one state and emit no light to indicate the other state. In some embodiments, the display characteristics of the lighting component 282 can be user-configurable. The display characteristics of the lighting components 686 of the networking component 106 may be similarly configured and varied. Different combinations of colors and patterns are possible as appropriate. The indicator component 208 can also indicate an active state or an inactive state in a variety of other ways.

When there is no active connection with a client computing device 122, or when there is no active data processing occurring, the computing device 102 may be taken down for maintenance or otherwise have its operation interrupted, and therefore the lighting component 282 can be set to the inactive state. Immediately after power up of the computing device 102, it may be the case that there is no processing occurring on behalf of a customer, such as execution of a virtual machine instance or active processing of data. Therefore, the default state of the lighting component may be the inactive state, and the indicator manager 214 can set the lighting component 282 to an active state accordingly. In some embodiments, the lighting component 282 can be configured to automatically assume a default state upon power up without receiving a command from the indicator manager 214. In some embodiments, the state of the lighting component 282 can be saved prior to shutdown in non-volatile memory, such as EPROM, or at the central management component 109, and the indicator manager 214 or the indicator component 208 can obtain the saved indicator state and resume it upon startup.

In some cases, the computing device 102 may have powered up after an unexpected shutdown. Under such circumstances, the computing device 102 may be configured to attempt to automatically recover any session data that was active at the time of the unexpected shutdown. If such a recovery is successful, then there may be active processing of data occurring shortly after computing device 102 power up and before any request is received from a client computing device 102. In such cases, the indicator manager 214 can be configured to set the lighting component to the active state, such as flashing red, which indicates active processing of data.

At block 506, the indicator manager 214 and/or the central management component 109 can monitor the activity of the computing device 102 to determine whether customer data has been loaded for processing, a virtual machine 216 has been instantiated, or the computing device 102 is otherwise operating on behalf of a customer or other user. The specific events that are being monitored, and which may trigger a change in the state of the indicator component 208, may be different for each computing device 102, or standardized across the entire network computing environment 100. The indicator manager 214 can be configured to monitor some or all system activity, and therefore may be in a position to recognize a state-changing event before the computing device 102 can load data or begin performing processing. In some embodiments, the indicator manager 214 tracks the number of open TCP connections. In some embodiments, the indicator manager 214 determines whether an allotted period of time has passed, such as preset or dynamically determined timeout periods, since the most recent activity. In some embodiments, the indicator manager 214 can make API calls to virtual machines 216 or other components of the computing device 102, requesting information about the current operating state of the computing device 102. In some embodiments, the indicator manager 214 receives regular updates with some or all activity occurring in the virtual machines 216, or heartbeats from the virtual machines 216 and other components of the computing device 102. The central management component 109 or some other component of the administrator system 108 can perform these monitoring functions instead of, or in addition to, the indicator manager 214, and can send notifications to the indicator manager 214 when the administrator system 108 determines that a state-changing event has occurred. In some embodiments, the indicator manager 214 can poll the central management component 109 for changes to state of the computing device 102. If the indicator manager 214 or central management component 109 determines that there such a change in system state, the process 500 can proceed to block 508. Otherwise, the process 500 can continue monitoring at block 506.

At block 508, the indicator manager 214 has detected a change in system state and/or received a notification of the change from the central management component 109 or some other component of the administrator system 108. If the indicator manager 214 detects a change in system state without a corresponding notification from the central management component 109, or if the indicator manager 214 receives a notification from the central management component 109 without detecting the change itself, a notification can be issued, alerting support staff to the discrepancy between the two monitoring components. In some embodiments, the indicator manager 214 can be configured to update the state of the indicator component 208 in response to instructions from the administrator system 108.

At block 510, the indicator manager 214 can set the indicator component 208 to the active state, indicating that there is active processing or an active network connection, and therefore maintenance may not proceed. If the indicator component 208 is configured with a message display 284, the indicator manager 214 can program the message display 284 as well. For example, the indicator manager 214 can program the message display 284 to show a message summarizing the current activity on the computing device 102. In another example, the indicator manager 214 can program the message display 284 to show an explicit warning not to take the computing device 102 offline. In addition, the indicator manager 214 may be configured to update a portion of non-volatile memory with the new state and/or message of the indicator component 208. In some embodiments, the central management component 109 can be configured to update the state of the indicator component 208, such as when the indicator component 208 is associated with a PDU 112 or other device that has no indicator manager 214.

At block 512, the indicator manager 214 or central management component 109 can monitor whether active processing has finished and/or network connections have terminated. If active processing has not finished, or if there remain active network connections, the indicator manager 214 and/or central management component 109 may continue to monitor the activity of the computing device 102 at block 512, and may proceed to a block 514 in response to some event or change in the state of the computing device 102.

At block 514, the indicator manager 214 has detected that the computing device 102 is no longer operating on behalf of a customer. For example, the indicator manager 214 may keep track of which processes are running on the computing device 102, and therefore the indicator manager 214 can detect when some or all processes associated with a customer have ceased or are no longer communicating with users. In some embodiments, the central management component 109 can be configured to detect when the computing device 102 is no longer operating on behalf of a customer instead of, or in addition to, the indicator manger 214 or some other component. If the indicator manager 214 detects that operation on behalf of a customer has ceased without a corresponding notification from the central management component 109, or if the indicator manager 214 receives a notification from the administrator system 108 without detecting the change itself, a notification can be issued, alerting support staff to the discrepancy between the two monitoring components. As described above, in some embodiments the indicator manager 214 can be configured to only update the state of the indicator component 208. In such cases, the indicator manager 214 will rely on the central management component 109 to instruct it when to do so.

At block 516, the indicator manager 214 or central management component 109 can set the indicator component 208 to the inactive state, indicating that there are no active processing tasks or network connections associated with the computing device 102, and therefore maintenance or some other interruption to the operation of the computing device 102 or a device supporting a computing device 102 may proceed. If the indicator component 208 is configured with a message display 284, the indicator manager 214 can program the message display 284 as well. For example, the indicator manager 214 can program the message display 284 to show a message stating that there is no customer or user activity occurring on the computing device 102, and/or that maintenance may proceed. In addition, the indicator manager 214 may be configured to update a portion of non-volatile memory with the new state and/or message of the indicator component 208.

The process 500 can be used to manage and update the state of the indicator components 608 of the networking component 106. In such a case, a separate component can control the state of the indicator components 608, such as a hardware or software component integrated into the networking component 106, a central management component 109, or some other component of the administrator system 108. Alternatively, functionality may be integrated into the indicator manager 214 or other component controlling the state of the indicator components 208 of the computing devices 102.

Terminology

Depending on the embodiment, certain acts, events, or functions of any of the routines or algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for managing computing devices, the system comprising:
   a first indicator device configured to indicate whether operation of a computing device is interruptible, the first indicator device configured to operate in:
      a first state indicating that the computing device is not executing any active customer workloads; and
      a second state indicating that the computing device executing at least one active customer workload;
   a second indicator device configured to indicate whether operation of a data center component is interruptible, the second indicator device configured to operate in:
      a third state indicating that the data center component is not supporting operation of any computing devices that are executing any active customer workloads; and
      a fourth state indicating that the data center component is supporting operation of at least the computing device that is executing the at least one active customer workload,
      wherein the data center component comprises an environmental control system or a power control system, wherein the data center component is configured to support operation of the computing device during execution of the at least one active customer workload, and wherein the data center component does not execute the at least one active customer workload; and
   a management component executed by one or more processors in communication with the first and second indicator devices, the management component configured to:
      initialize the first indicator device to the first state and the second indicator device to the third state;
      analyze usage data regarding one or more activities executing on the computing device;
      determine that an activity of the one or more activities executing on the computing device corresponds to an active customer workload, the determining based at least in part on the analysis of the usage data; and
      cause, based at least in part on the determination, the first indicator device to change to the second state and the second indicator device to change to the fourth state.

2. The system of claim 1, wherein usage data comprises data indicating that a virtual machine instance is executing on the computing device.

3. The system of claim 1, wherein the first indicator device comprises a first lighting component.

4. The system of claim 3, wherein the management component is configured to cause the first lighting component to emit light of a first color in the first state and cause the first lighting component to emit light of a second color in the second state.

5. The system of claim 3, wherein the management component is configured to cause the first lighting component to emit light in one of the first state or second state.

6. The system of claim 1, wherein the management component is further configured to cause a change in the state of the first indicator device in response to a network connection with a client computing device being opened or closed.

7. The system of claim 1, wherein the second state further indicates that the computing device is available for powering down, disconnecting from a network, or performing maintenance.

8. The system of claim 1, wherein the first indicator device further comprises a message display configured to display a message regarding a status of the computing device.

9. The system of claim 1, wherein the management component is further configured to communicate with an administrator computing device, the administrator computing device configured to cause the management component to change the state of the first indicator device.

10. The system of claim 1, wherein the computing device comprises one or more hot-swappable components.

11. A system for managing data center components, the system comprising:
   an indicator device in communication with a management component, the indicator device associated with a data center component, the indicator device configured to indicate whether operation of the data center component can be interrupted,
      wherein the data center component comprises an environmental control system or a power control system, and
      wherein the indicator device is configured to operate in a first state indicating that the data center component is not configured to support any computing devices that are processing any active workloads associated with users, and to operate in a second state indicating that the data center component is configured to support a computing device that is processing any active workload associated with a user; and
   the management component, wherein the management component is configured to control the state of the indicator device, the management component executing on computing hardware in communication with the indicator device, wherein the management component is configured to:
      determine that the computing device is executing an active workload associated with the user;
      determine that the data center component is configured to support the computing device, wherein the data center component is not executing the active workload associated with the user; and
      in response to the determination that the data center component is configured to support the computing device, cause the indicator device to change to the second state.

12. The system of claim 11, wherein the environmental control system comprises at least one of a heating, ventilation, or an air conditioning unit.

13. The system of claim 11, wherein the data center component comprises a hot-swappable component.

14. The system of claim 11, wherein the indicator device comprises a lighting component.

15. The system of claim 14, wherein the management component is configured to cause the lighting component to emit light of a first color in the first state and cause the lighting component to emit light of a second color in the second state.

16. The system of claim 14, wherein the management component is configured to cause the lighting component to emit light in one of the first state or second state.

17. The system of claim 11, wherein the first state further indicates that the data center component is available for powering down, disconnecting from a network, or performing maintenance.

18. The system of claim 11, wherein the management component is further configured to communicate with an administrator computing device, the administrator computing device configured to cause the management component to change the state of the indicator device.

19. A method for managing computing devices, the method comprising:
   identifying usage data reflective of one or more activities executing on a computing device;
   determining, by a computing system comprising one or more computing devices, that an activity of the one or more activities executing on the computing device corresponds to an active customer workload, the determining based at least in part on the identification of the usage data;
   in response to said determining that the computing device is executing the active customer workload, actuating a first hardware indicator component associated with the computing device to indicate that the computing device is executing the active customer workload;
   determining, by the computing system, that a data center component is configured to support operation of the computing device during execution of the active customer workload, wherein the data center component comprises at least one of an environmental control system or a power control system, and wherein the data center component does not execute the active customer workload; and
   in response to the determining that the computing device is executing the active customer workload, actuating a second hardware indicator component associated with the data center component to indicate that the data center component is supporting the active customer workload.

20. The method of claim 19, wherein the computing system comprises the computing device.

21. The method of claim 19, wherein the one or more activities comprises at least one of opening or closing a network connection with a client computing device.

22. The method of claim 19, wherein the one or more activities comprises at least one of obtaining, processing, or transmitting data associated with a client computing device.

23. The method of claim 19, wherein actuating the first hardware indicator component comprises changing a state of a first hardware lighting component.

24. The method of claim 23, wherein the first hardware lighting component has a first state indicating that the computing device is not executing any active customer workloads, and a second state indicating that the computing device is executing the active customer workload.

25. The method of claim 24, further comprising:
in response to determining that an activity of the one or more activities executing on the computing device corresponds to an active customer workload, providing an indication that the computing device is executing the active customer workload, wherein the indication comprises changing the state of the first hardware lighting component to the second state.

26. The method of claim 24, wherein the management component is configured to cause the first hardware lighting component to emit light of a first color in the first state and cause the first hardware lighting component to emit light of a second color in the second state.

27. The method of claim 24, wherein the management component is configured to cause the first hardware lighting component to emit light in one of the first state or second state.

* * * * *